Patented Aug. 30, 1932

1,875,014

UNITED STATES PATENT OFFICE

OSCAR KASELITZ, OF BERLIN, GERMANY

PRODUCTION OF ALKALI METAL NITRATES

No Drawing. Application filed January 29, 1931, Serial No. 512,195, and in Germany May 2, 1929.

My invention relates to the production of alkali metal nitrates and more especially to a method of producing such nitrates by interaction of another alkali metal salt with nitrogen oxides. It is an object of our invention to provide means whereby this reaction can be carried through in a more efficient and economical manner than was hitherto possible.

Alkali metal nitrates are nowadays increasingly used for fertilizing purposes and their manufacture on a large scale has therefore gained increased importance. The most advantageous starting materials for their production are the alkali metal chlorides and nitrous gases or dilute nitric acid.

Now every expert knows that alkali metal nitrates can be obtained by acting with nitric acid on watery solutions of alkali metal chlorides or with watery solutions of nitric acid on solid alkali metal chlorides. It is further known that gaseous nitric acid, which is strongly diluted with water vapor, is capable of partly converting alkali metal chloride into nitrate. However, this last-mentioned process is required to be carried through under conditions which cause condensation of a greater part of the vapor, so that this process substantially occurs in the same manner as the interaction between nitrous gases and watery solutions of alkali metal chlorides. The process therefore results in a mixture of solid alkali metal chloride and a mother liquor, so that the necessity arises of drying the salt and evaporating the mother liquor.

I have now found that by acting with gaseous nitrogen oxides containing smaller or greater quantities of water vapor on a solid alkali metal chloride, solid alkali metal nitrate can be directly obtained.

According to my invention I cause the reaction to take place at a temperature which is so much higher than the temperature at which the entering and escaping vapors condense (i. e. the dew points of the components of said gas mixture), that no liquid phases can form in the reaction chamber. I may obtain this by either heating the reaction chamber from without or by superheating the entering vapors to such an extent that they carry into the apparatus the heat required for the reaction and for the compensation of the losses by radiation.

Of the many gaseous nitrogen oxides I may for instance use the gases obtained in the process of oxidizing ammonia, for these gases carry a sufficient quantity of heat energy to cover all losses. If these gases are freed from the greater part of the water vapor by chilling and the formation of $NO_2$ is favoured, the reaction is accelerated in consequence of the greater percentage of $NO_2$ and/or $N_2O_3$ per unit of the gas volume.

I may, however, also start from nitric acid, preferably highly concentrated, the vapors formed by evaporation being conducted over the solid alkali metal chloride. Since nitric acid, if evaporated, is partly decomposed into water vapour and nitrogen oxides, it will be understood that the vapours thus formed contain water, partly in vapour form and partly bound in the form of nitric acid vapours. Consequently, whenever gas mixtures containing nitrogen oxides and water vapour are mentioned in this specification and in the claims affixed thereto, this language is intended to also cover the gas mixture or vapours obtained by evaporating nitric acid.

The alkali metal nitrate obtained in this process is absolutely dry and neutral and can therefore be put to use as fertilizer without any further treatment. The gases escaping from the reaction chamber consist of varying quantities of nitrosyl chloride, chlorine, nitrogen oxides, water vapor, oxygen and nitrogen, according to the period of time consumed by the reaction. They can be separated in a well known manner into mixtures containing Cl on the one hand and NO on the other hand, the NO being returned into the operation.

In the practice of my invention I may use any well known apparatus adapted and used for reactions occuring between solids and gases.

I am aware that it is known to lead the gases resulting from the interaction of nitrous gases and potassium chloride which substantially form a mixture of nitrosyl chloride and chlorine over heated nitrates of the alkaline earth metals, whereby these gases are split up, the chlorine being altogether bound, while nitrogen oxides escape.

By the new process above described in combination with the known process mentioned in the preceding paragraph I am enabled to operate in a cycle, the entire $NO_3$ consumed in the process, which is required for decomposing the dry alkali metal chloride, being supplied by a corresponding quantity of dry calcium nitrate, this latter being converted into dry calcium chloride.

The calcium nitrate required in the process may be obtained by combining the nitrous gases resulting in the oxidation of ammonia with caustic lime or carbonate of lime, the temperature being so adjusted that a nitrate is obtained which contains as little water as possible.

The advantage offered by the new process consists therein that instead of the nitrous gases laden with large quantities of water vapor only highly concentrated nitrogen oxides are used which after having acted on the alkali metal chloride yield substantially only nitrosyl chloride, which when acting on calcium nitrate is reconverted into concentrated pure nitrogen oxides under formation of calcium chloride. Inasmuch as the reaction is characterized in the beginning and at the final stage by a change of the place of the ions, the quality of oxygen required for the oxidation will be present in the circulating gases without any supply of air or oxygen from without, even if lower nitrogen oxides should be formed during the process.

In order to lead to an end the conversion of alkali metal chloride and calcium nitrate I prefer operating in a pure cyclic process with a plurality of charges arranged in series, from which the completely converted products are discarded. It is also possible to use continuously operating apparatus, such as shaft furnaces, rotary furnaces, furnaces, such as used in the roasting of pyrites etc., because the expulsion of the last traces of chlorine and of nitrogen oxides occurs too slowly towards the end of the process.

There is no need for keeping out all traces of water in the process, for the two processes on which the present invention is based occur above the temperature of condensation (i. e. above the dew point) of water. It is merely necessary that the two products (alkali metal nitrate and calcium chloride) are directly obtained in dry solid form.

The calcium nitrate may also be replaced by the nitrates of other alkaline earth metals, earth metals and suitable heavy metals.

Example 1

A current of the products of reaction produced in the oxidation of ammonia, from which the water is not separated, is conducted over 63 grams solid potassium chloride in the form of agglomerated spherical bodies, a temperature of 145° C. being maintained and the rate of flow being 1,5 litres $NO_2$ per hour. In this reaction a neutral and dry high-grade potassium nitrate is obtained. The potassium chloride is converted into potassium nitrate at the following rate:

| | Per cent potassium nitrate formed |
|---|---|
| After 12 hours | 34 |
| After 24 hours | 50 |
| After 36 hours | 57 |
| After 48 hours | 63 |
| After 60 hours | 69 |
| After 72 hours | 73 |
| After 84 hours | 77 |
| After 96 hours | 80 |
| After 108 hours | 84 |
| After 120 hours | 88 |
| After 132 hours | 93 |
| After 144 hours | 96 |

Example 2

Under the conditions of operation explained with reference to Example 1, however raising the temperature to 165° C. and starting from 70 grams NaCl the following rate of conversion has been obtained:

| | Per cent sodium nitrate formed |
|---|---|
| After 12 hours | 25.40 |
| After 24 hours | 41.4 |
| After 36 hours | 54.5 |
| After 48 hours | 68.5 |
| After 60 hours | 74.0 |
| After 72 hours | 80.0 |
| After 84 hours | 84.0 |
| After 96 hours | 87.04 |
| After 108 hours | 90.0 |
| After 120 hours | 93.5 |
| After 132 hours | 97.0 |
| After 144 hours | 100.0 |

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing alkali metal nitrates by acting on an alkali metal chloride with a nitrogen oxide comprising acting on a solid alkali metal chloride with nitrous gases at a temperature above the condensation temperature of said gases, conducting the escaping gases being a mixture of nitrosyl chloride and chlorine over a heated metal nitrate and causing the nitrogen oxides formed in this reaction to act on a fresh portion of the solid alkali metal chloride.

2. The method of producing alkali metal nitrates by acting on an alkali metal chloride with a nitrogen oxide comprising acting on a solid alkali metal chloride with nitrous gases at a temperature above the condensation temperature of said gases, conducting the escaping gases being a mixture of nitrosyl chloride and chlorine over a heated alkaline earth metal nitrate and causing the nitrogen oxides formed in this reaction to act on a fresh portion of the solid alkali metal chloride.

3. The method of producing alkali metal nitrates by acting on an alkali metal chloride with a nitrogen oxide comprising acting on an alkali metal chloride with nitrous gases at a temperature above the condensation temperature of said gases, conducting the escaping gases, being a mixture of nitrosyl chloride and chlorine, over heated calcium nitrate and causing the nitrogen oxides formed in this reaction to act on a fresh portion of the solid alkali metal chloride.

4. The method of producing alkali metal nitrates by acting on an alaki metal chloride with a nitrogen oxide comprising subjecting a solid alkali metal chloride to the action of a gas mixture containing a nitrogen oxide and water vapour and maintaining the reaction temperature above the dew points of the constituents of said gas mixture to prevent the separating out of a liquid phase.

5. The method of producing alkali metal nitrates by acting on an alkali metal chloride with a nitrogen oxide comprising subjecting a solid alkali metal chloride to the action of a gas mixture containing a nitrogen oxide and water vapour, maintaining the reaction temperature above the dew points of the constituents of said gas mixture to prevent the separating out of a liquid phase, freeing the escaping gases from chlorine and returning them into the reaction.

6. The method of producing alkali metal nitrates by acting on an alkali metal chloride with a nitrogen oxide comprising subjecting a solid alkali metal chloride to the action of a gas mixture containing evaporated nitric acid and maintaining the reaction temperature above the dew points of the constituents of said gas mixture to prevent the separating out of a liquid phase.

7. The method of producing alkali metal nitrates by acting on an alkali metal chloride with a nitrogen oxide comprising subjecting a solid alkali metal chloride to the action of a gas mixture containing nitrous gases and water vapour and maintaining the reaction temperature above the dew points of the constituents of said gas mixture to prevent the separating out of a liquid phase.

8. The method of producing alkali metal nitrates by acting on an alkali metal chloride with a nitrogen oxide comprising subjecting a solid alkali metal chloride to the action of a gas mixture containing evaporated nitric acid, maintaining the reaction temperature above the dew points of the constituents of said gas mixture to prevent the separating out of a liquid phase, freeing the escaping gases from chlorine and returning them into the reaction.

9. The method of producing alkali metal nitrates by acting on an alkali metal chloride with a nitrogen oxide comprising subjecting a solid alkali metal chloride to the action of a gas mixture containing a nitrogen oxide and water vapour, maintaining the reaction temperature above the dew points of the constituents of said gas mixture to prevent the separating out of a liquid phase, freeing the escaping gases from chlorine and nitrogen and returning them into the reaction.

In testimony whereof I affix my signature.

OSCAR KASELITZ.